(12) United States Patent
Saccardo

(10) Patent No.: US 10,108,026 B2
(45) Date of Patent: Oct. 23, 2018

(54) HINGE DEVICE FOR EYEGLASSES

(71) Applicant: LUXOTTICA S.R.L., Agordo (IT)

(72) Inventor: Roberto Saccardo, Vicenza (IT)

(73) Assignee: LUXOTTICA S.R.L., Agordo (IT)

( * ) Notice: Subject to any disclaimer, the term of this patent is extended or adjusted under 35 U.S.C. 154(b) by 0 days.

(21) Appl. No.: 15/313,064

(22) PCT Filed: May 13, 2015

(86) PCT No.: PCT/EP2015/060652
§ 371 (c)(1),
(2) Date: Nov. 21, 2016

(87) PCT Pub. No.: WO2015/177033
PCT Pub. Date: Nov. 26, 2015

(65) Prior Publication Data
US 2017/0192249 A1    Jul. 6, 2017

(30) Foreign Application Priority Data
May 21, 2014 (IT) ............... MI2014A0923

(51) Int. Cl.
*G02C 5/22* (2006.01)
(52) U.S. Cl.
CPC ............ *G02C 5/22* (2013.01); *G02C 5/2209* (2013.01)
(58) Field of Classification Search
CPC .......... G02C 5/22; G02C 5/08; G02C 5/2218; G02C 5/2272; G02C 9/02; G02C 5/2227
USPC .................... 351/153, 140; 16/228
See application file for complete search history.

(56) References Cited

U.S. PATENT DOCUMENTS

| 3,427,681 | A |   | 2/1969 | Smith, Jr. | |
| 5,596,789 | A | * | 1/1997 | Simioni | G02C 5/2209 16/224 |
| 5,971,539 | A | * | 10/1999 | Kobayashi | G02C 5/2209 16/228 |

FOREIGN PATENT DOCUMENTS

| DE | 102006016297 A1 | 10/2007 |
| DE | 202011051139 U1 | 11/2011 |
| GB | 463491 A | 4/1937 |
| GB | 1003661 A | 9/1965 |
| WO | 2005111701 A1 | 11/2005 |

OTHER PUBLICATIONS

International Search Report dated Aug. 3, 2015 re: Application No. PCT/EP2015/060652; pp. 1-4; citing: GB 1 003 661 A, U.S. Pat. No. 3,427,681 A, WO 2005/111701 A1, GB 463 491 A, DE 10 2006 016297 A1 and DE 20 2011 051139 U1.
Written Opinion dated Aug. 3, 2015 re: Application No. PCT/EP2015/060652; pp. 1-6.

* cited by examiner

*Primary Examiner* — Hung Dang
(74) *Attorney, Agent, or Firm* — Cantor Colburn LLP

(57) ABSTRACT

A hinge device for eyeglasses includes an accommodation body provided with engagement seats for gripping and locking a hinge body to an end piece of an eyeglass frame. The hinge body includes a central body that is adapted to engage within the accommodation body. The central body is further configured to engage in turn a temple of the eyeglass frame.

9 Claims, 10 Drawing Sheets

HINGE DEVICE FOR EYEGLASSES

CROSS REFERENCE TO RELATED APPLICATIONS

This application is related to and claims the benefit of Italian Patent Application No. MI2014A000923, filed on May 21, 2014, the contents of which are herein incorporated by reference in its entirety

TECHNICAL FIELD

The present disclosure relates to a hinge device for eyeglasses. More specifically, the disclosure relates to a hinge device for eyeglasses that is small and compact.

BACKGROUND

As is known, there are hinge devices for eyeglasses on the market which make it possible to couple the temple of the eyeglass frame to the end piece of the eyeglass frame, so as to allow a rotation of the temple to close against the end piece and to open in order to allow the user to wear the eyeglasses.

The conventional hinge devices are usually made with screws and/or with welds which however involve structural mechanical weak points.

Furthermore, it often happens that the screw of the hinge device unscrews as a result of the numerous operations to open and close the temple of the eyeglass frame, and thus there is the problem that the user risks losing the screw.

Furthermore, the screw of the hinge device has to be screwed into a thread that is specially made so as to mate perfectly with such screw. Such mechanical machining requires an accurate level of precision and consequent costs.

Furthermore, the friction necessary for the temple of the eyeglass frame to be able to be opened while offering a certain resistance is referred, in traditional hinge devices, to the screw proper, which, during use, tends to become stripped, and thus tends to render the friction that it exerts less effective.

Furthermore, in conventional hinge devices the screw is accessible from outside of the end piece of the eyeglass frame, and this entails a design that is certainly not minimal, and especially it contributes to increasing the size of the hinge device and its weight.

SUMMARY

The aim of the present disclosure is to provide a hinge device for eyeglasses which has a small and compact structure so as to make it possible for the eyeglass frame to be lighter.

Within this aim, the present disclosure provides a hinge device for eyeglasses, by way of which the eyeglass frame can have a clean and minimal design, with a refined appearance.

The present disclosure also provides a hinge device for eyeglasses which entails fewer problems from a mechanical viewpoint with respect to conventional hinge devices.

The present disclosure further provides a hinge device for eyeglasses which ensures, over time, a high degree of resistance to opening/closing the temple on the end piece of the eyeglass frame.

The present disclosure still provides a hinge device for eyeglasses which is highly reliable, easily and practically implemented and low cost.

These advantages and features which will become better apparent hereinafter are achieved by providing a hinge device for eyeglasses, wherein the hinge device comprises an accommodation body provided with engagement seats for gripping and locking a hinge body to an end piece of an eyeglass frame, said hinge body comprising a central body that is adapted to engage within said accommodation body, said central body being adapted to engage in turn a temple of said eyeglass frame.

BRIEF DESCRIPTION OF THE DRAWINGS

Further characteristics and advantages of the disclosure will become better apparent from the description of preferred, but not exclusive, embodiments of the hinge device according to the disclosure, which are illustrated by way of non-limiting example in the accompanying drawings wherein.

DETAILED DESCRIPTION OF THE DRAWINGS

Figure 1:
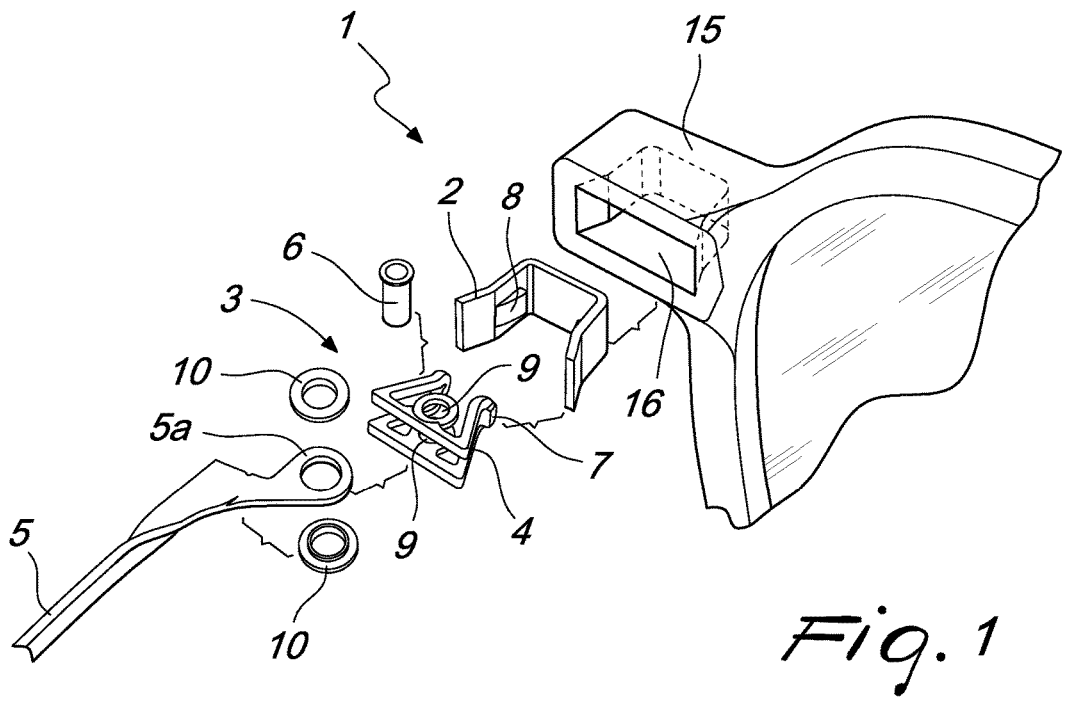
FIG. 1 is an exploded perspective view of a first embodiment of the hinge device according to the present disclosure, applied to an end piece of an eyeglass frame.
Figure 2:
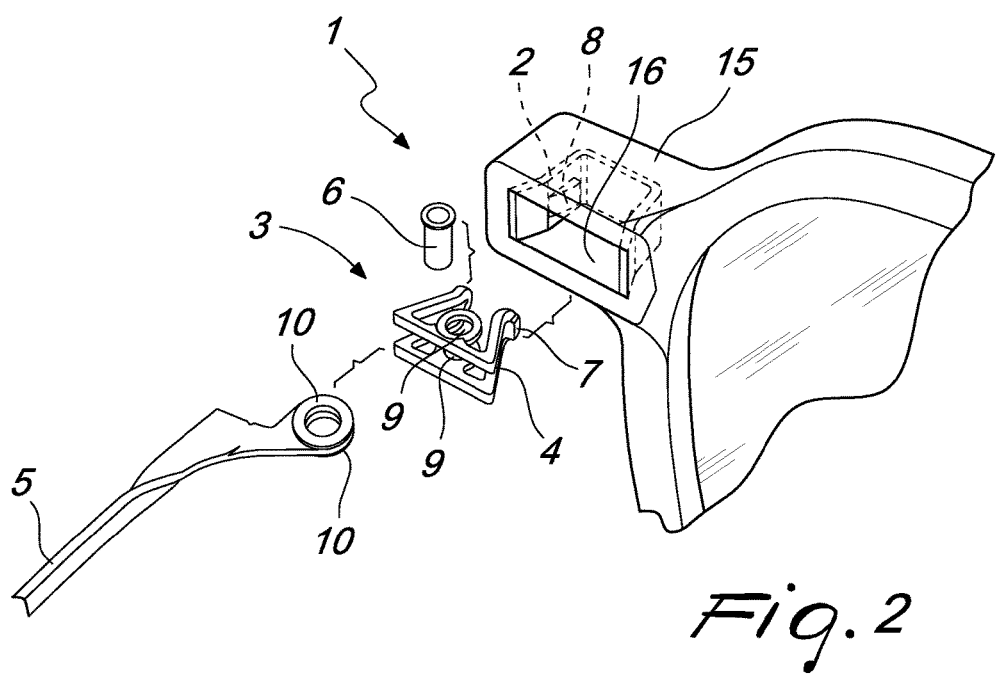
FIG. 2 is an exploded perspective view of the device in FIG. 1 in a partially assembled condition.
Figure 3:
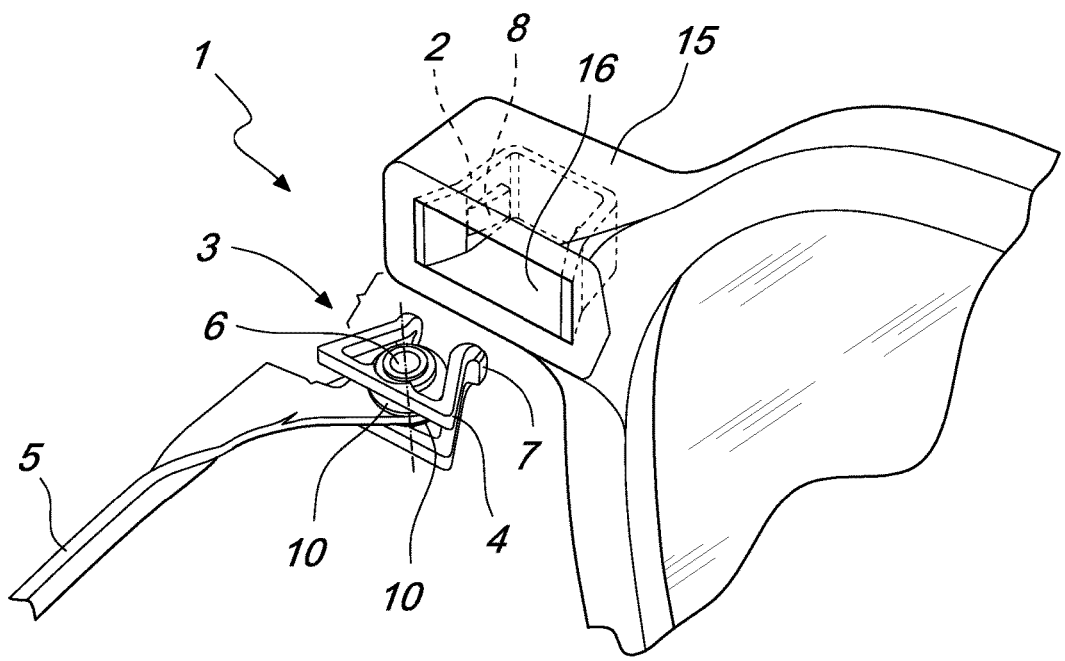
FIG. 3 is an exploded perspective view of the device in FIGS. 1 and 2, in a further partially assembled condition.
Figure 4:
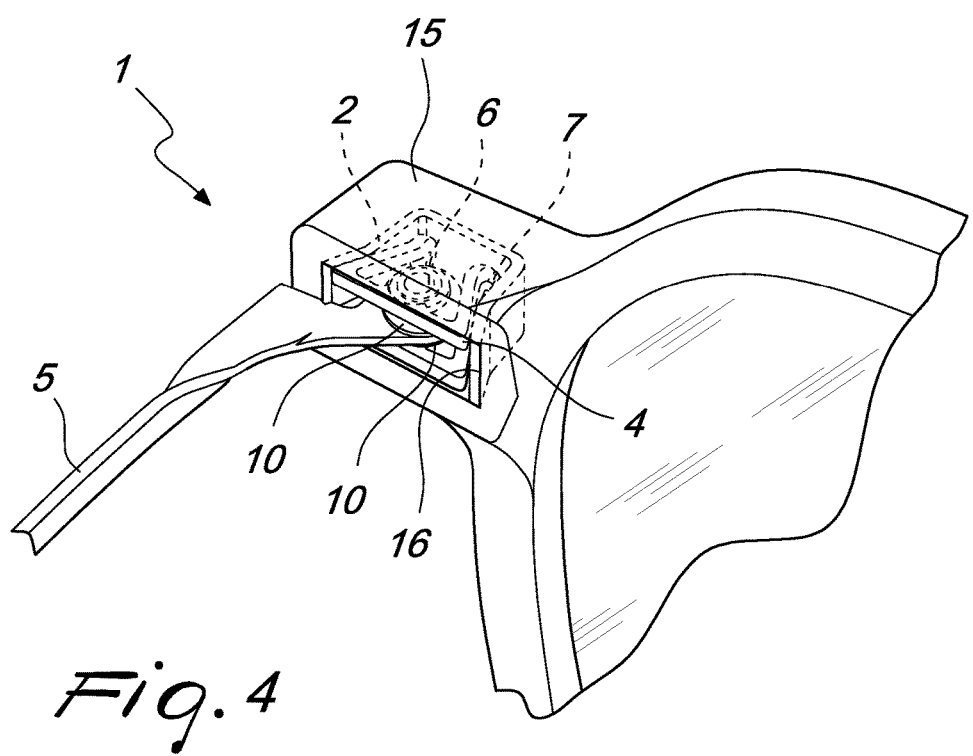
FIG. 4 is an exploded perspective view of the device in FIGS. 1, 2 and 3, in the assembled condition on the end piece of an eyeglass frame.
Figure 5:
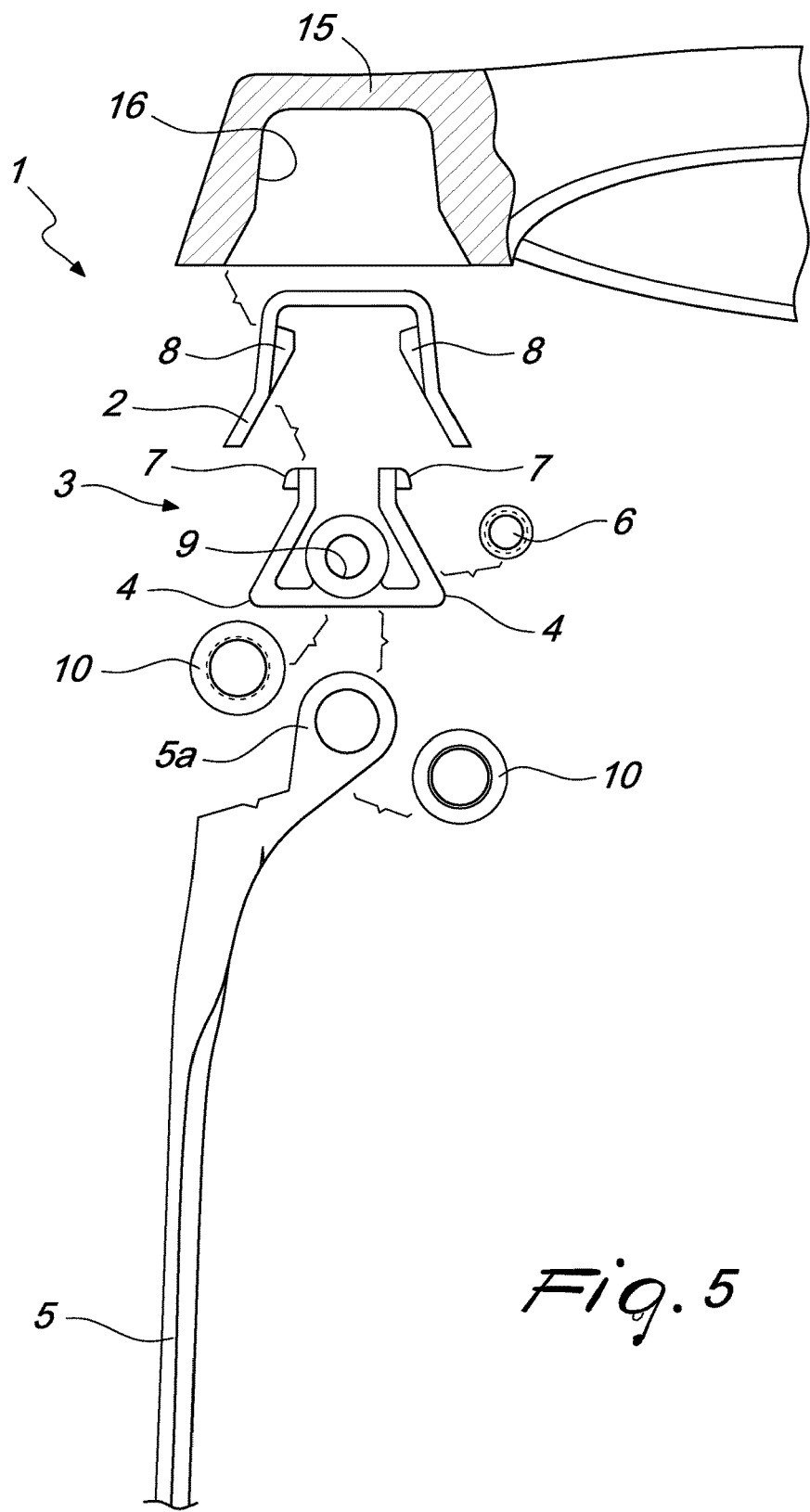
FIG. 5 is an exploded plan view, partially in cross-section, of the device according to the disclosure according to the first embodiment thereof.
Figure 6:
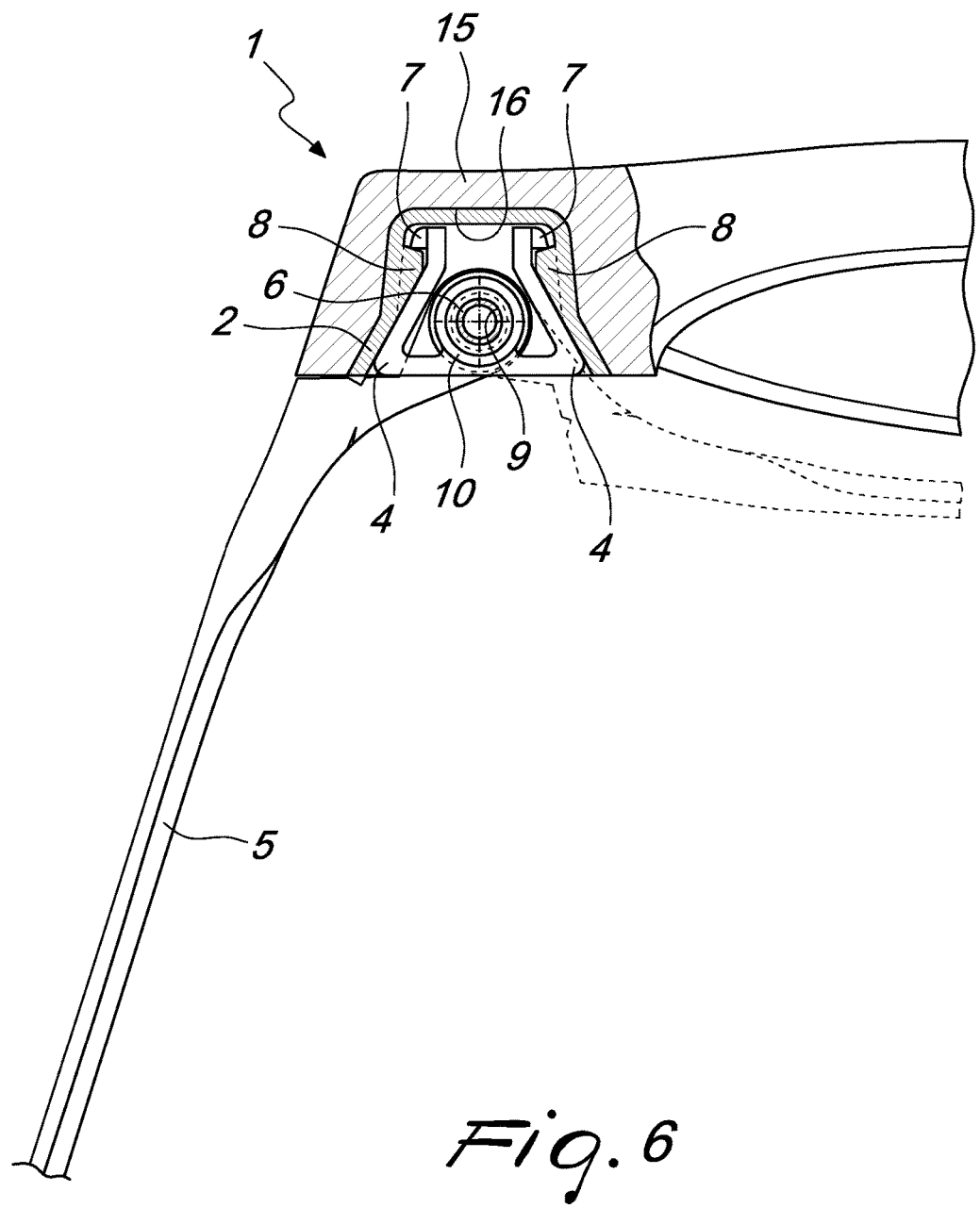
FIG. 6 is a plan view, partially in cross-section, of the device according to the disclosure, according to the first embodiment thereof, in the assembled condition.
Figure 7:
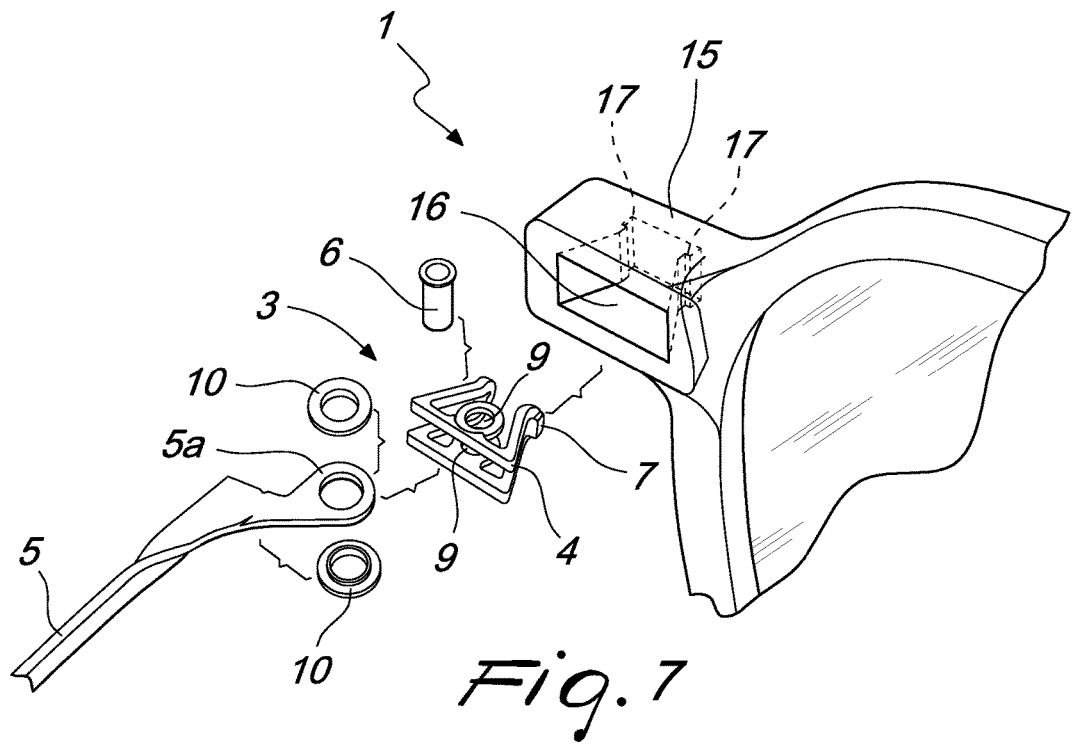
FIG. 7 is an exploded perspective view of a second embodiment of the hinge device according to the disclosure.
Figure 8:
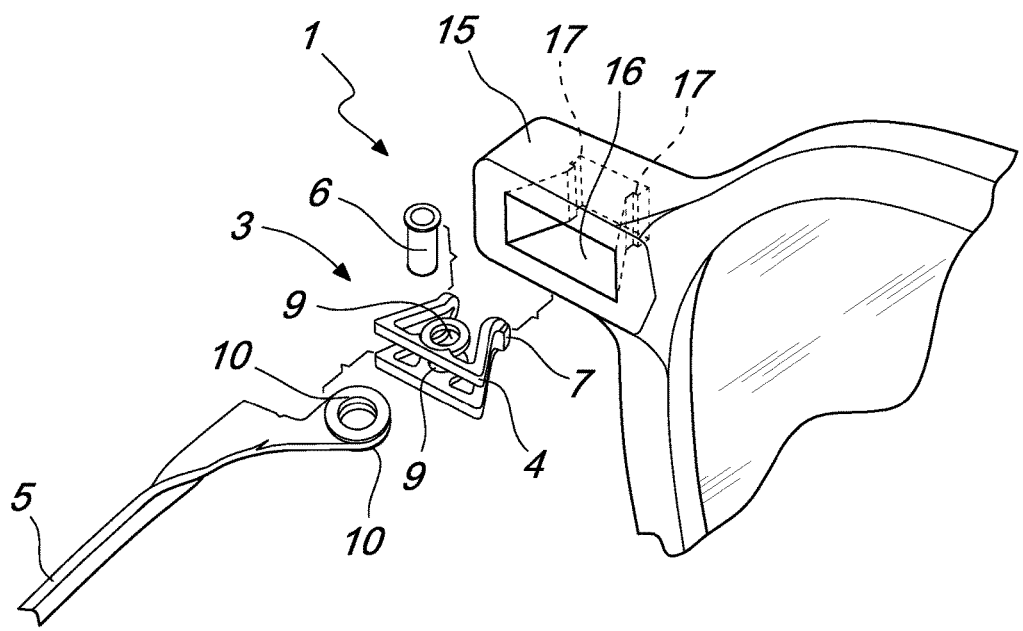
FIG. 8 is a perspective view of the device in FIG. 7 in a partially assembled condition.
Figure 9:
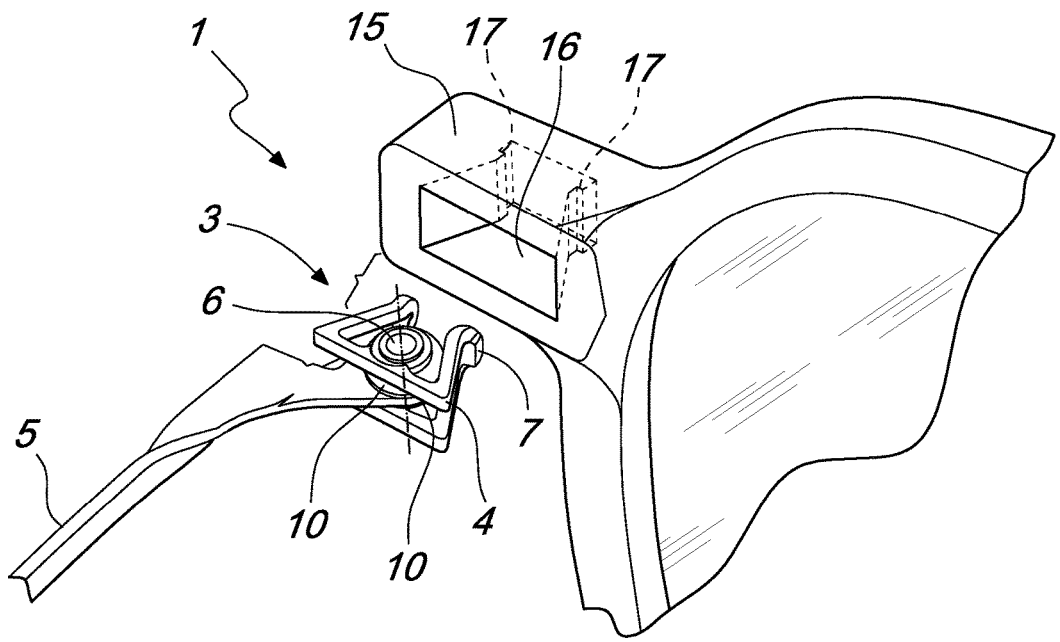
FIG. 9 is a perspective view of the device in FIGS. 7 and 8, in a further partially assembled condition.
Figure 10:
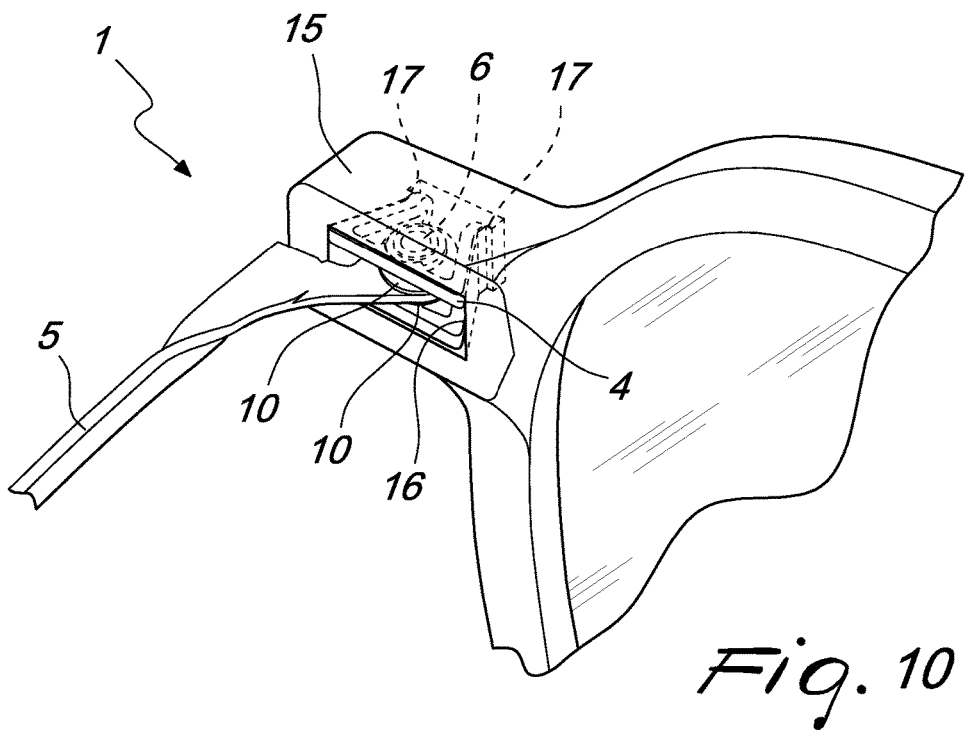
FIG. 10 is a perspective view of the device in FIGS. 7, 8, and 9, in the assembled condition.
Figure 11:
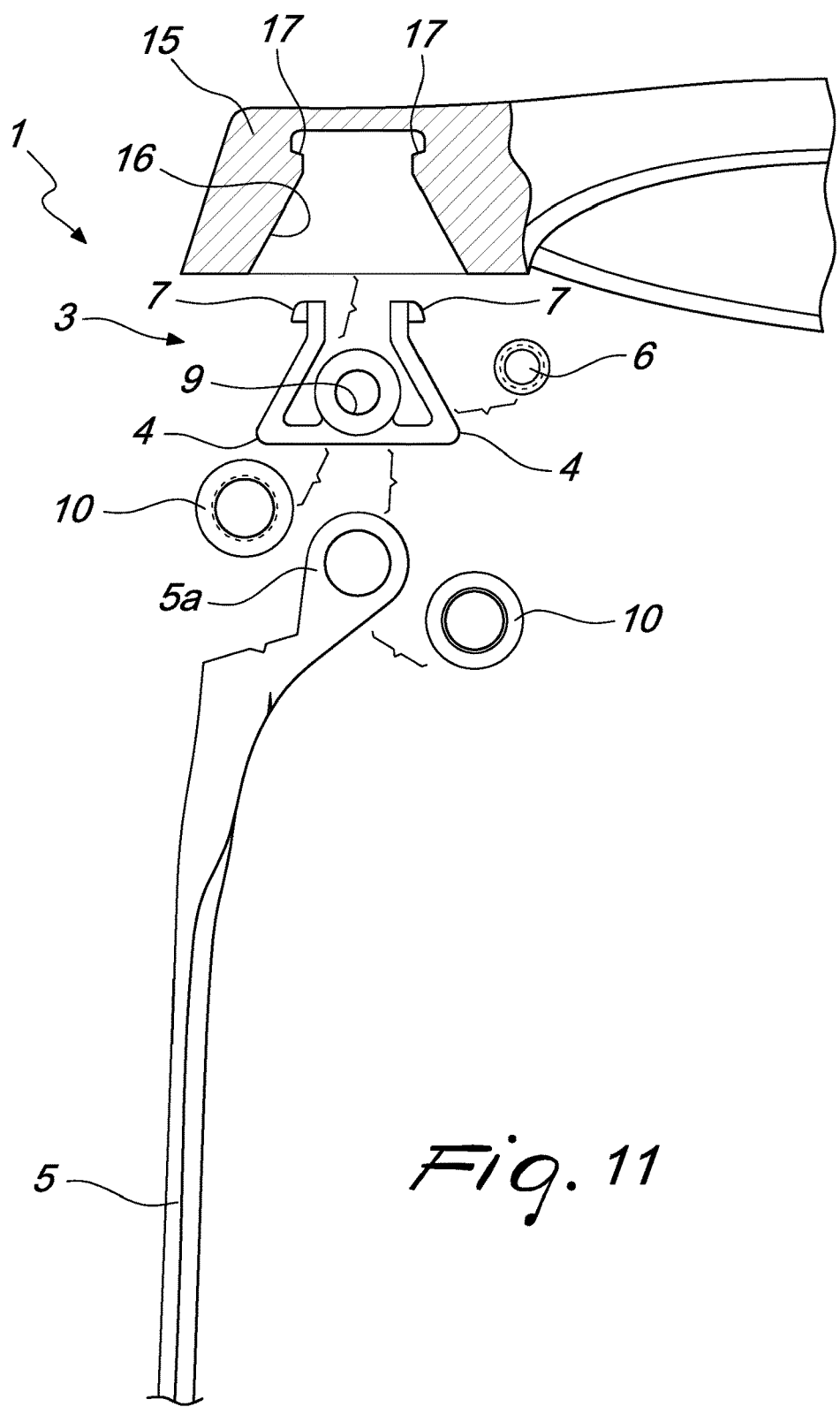
FIG. 11 is an exploded plan view, partially in cross-section, of the device according to the disclosure according to the second embodiment thereof.
Figure 12:
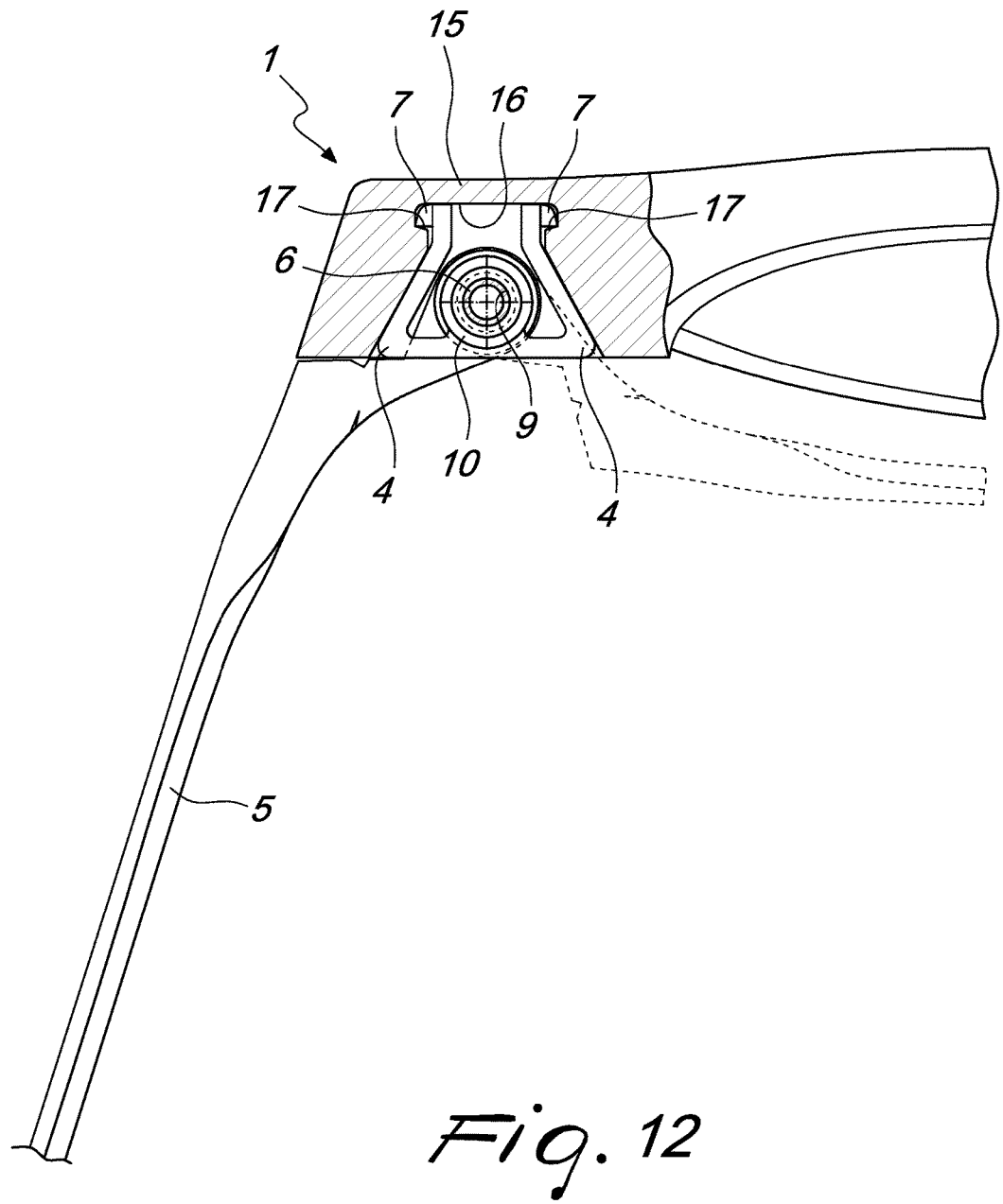
FIG. 12 is a plan view, partially in cross-section, of the device according to the disclosure, according to the second embodiment thereof, in the assembled condition.

With reference to the figures, the hinge device for eyeglasses, in a first embodiment thereof, and generally designated by the reference numeral 1, comprises an accommodation body 2 that is provided with engagement seats that enable the gripping and permanent locking of a hinge body 3 to an end piece 15 of the eyeglass frame. In particular, the hinge body 3 is constituted by a central body 4 which is provided, in a first embodiment, as a first C-shaped hollow body and contains engagement teeth 7 that are arranged at the respective ends of the C and are shaped so as to undetachably couple within engagement seats 8 that are defined in the accommodation body 2.

The first C-shaped hollow body 4 is provided with a pair of eyelets 9 that are arranged one over the other and spaced apart from each other, and which allow the insertion of a pivot 6.

Conveniently, the accommodation body 2 is contoured so as to define a second C-shaped hollow body that contains the engagement seats 8 that enable the undetachable coupling with the engagement teeth 7 of the first C-shaped hollow body 4.

The central body 4 allows coupling with a temple 5 of the eyeglass frame, and in particular the temple 5 of the eyeglass frame is provided with an eyelet 5a, which is inserted between the eyelets 9 of the first C-shaped hollow body, so that the eyelets 9 and the eyelet 5a are aligned along a same pivoting axis.

In order to create the necessary friction and thus prevent a free rotation of the temple 5 of the eyeglass frame, washers 10 are provided which are adapted to be inserted along the hinging axis, are made of polymeric or metallic material and are arranged symmetrically so as to interpose themselves between the eyelets 9 and the eyelet 5a.

The body 3 of the hinge and the accommodation body 2 are made from flexible materials, for example metallic materials, or polymeric materials or ceramic materials, or composite materials, or a combination thereof, so as to allow the temporary deformation of the engagement teeth 7 of the first C-shaped hollow body 4 and of the walls of the engagement seats 8 of the second C-shaped hollow body 2 at the moment of insertion of the body 3 of the hinge in the accommodation body 2.

Similarly to the body 3 of the hinge and to the accommodation body 2, the first C-shaped hollow body 4 and the second C-shaped hollow body 2 can also be made for example of metallic materials, or polymeric materials, or ceramic materials, or composite materials, or a combination thereof.

The first C-shaped hollow body 4 is modeled, for example by milling, so that the eyelets 9 are depressed with respect to the upper profile of the C, so as to define space for the pivot 6.

Such pivot can for example be a rivet, which is upset between the central body 4 and the eyelet 5a, so as to define the body 3 of the hinge.

The hinge 3 is adapted to be inserted in an accommodation body 2 and locked by way of the engagement between the engagement teeth 7 of the first C-shaped hollow body 4 and the engagement seats 8 of the second C-shaped hollow body (or accommodation body 2).

In a first embodiment, the second C-shaped hollow body which defines the accommodation body 2 is a separate element which is inserted in the portion 16 for accommodating the end piece 15 of the eyeglass frame.

In such embodiment, the first C-shaped hollow body 4 is made from metallic material, starting from a flat element of sheet metal, in which the engagement teeth 6 and the eyelets 9, which are necessary for the insertion of the pivot 6, are drawn, for example by way of laser cutting. The C-shape is obtained by folding, according to an axis of symmetry, the sheet metal element so that the two eyelets 9 are arranged one above the other, coaxial, along the hinging axis of the hinge.

The second C-shaped hollow body 2 (or accommodation 2) is for example made from metallic material, also starting from a flat element of sheet metal. The C-shape can be obtained in this case also by folding of the sheet metal element, so that the engagement seats are arranged on the concave surface of the C.

As an equivalent and alternative to the foregoing description, the first C-shaped hollow body 4 and the second C-shaped hollow body 2 can be made directly with a three-dimensional shape from metallic material by mechanical milling starting from a solid element, or from metallic material by way of a process of precision casting, or from metallic material by way of a process known as metal injection molding (MIM), or from ceramic material by way of a process known as ceramic injection molding (CIM).

In another alternative the first C-shaped hollow body 4 and the second C-shaped hollow body 2 can be made from polymeric material or from composite material.

In a second embodiment, the second C-shaped hollow body or accommodation is provided directly in the portion 16 of the end piece 15 which is provided by way of mechanical machining, for example by milling (if the eyeglass frame is made from metallic, polymeric or composite material), or directly by injection molding of the end piece 15 (if the eyeglass frame is made from polymeric material).

Therefore, the difference between the second and the first embodiment is given by the fact that the second C-shaped hollow body is not an additional element but is defined directly at the portion 16 of the end piece 15, in which the portion 16 defines the seat for directly accommodating the first C-shaped body 4.

In this case the portion 16 is provided with retaining teeth 17 which make it possible to lock the teeth 7 of the first C-shaped hollow body 4.

The disclosure further relates to an eyeglass frame provided with a hinge device as described above.

In practice it has been found that the hinge device for eyeglasses according to the present disclosure fully achieves the set aim and objects.

The device, thus conceived, is susceptible of numerous modifications and variations.

Thus, for example, instead of the second C-shaped hollow body 2, a boxlike body 25 can be used which is provided with teeth 8, similarly to the second C-shaped hollow body 2.

Figure 13:
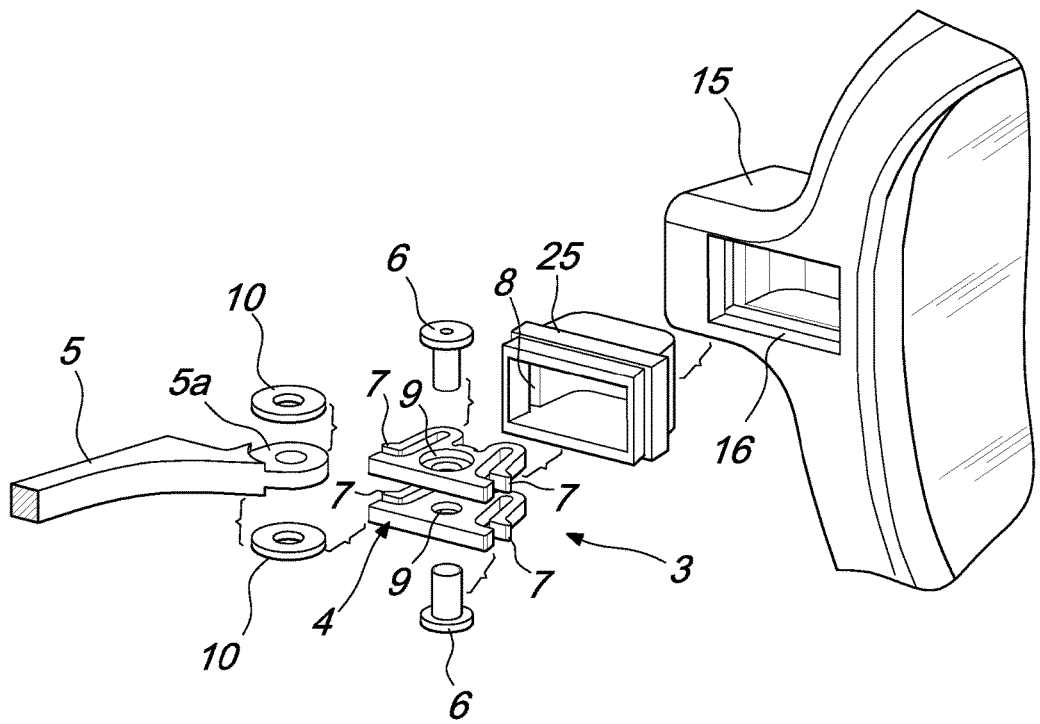
FIG. 13 is an exploded perspective view of a variation of the first embodiment of the device according to the disclosure.

Such solution is shown in FIG. 13, in which the central body 4 is provided in one piece as in the first embodiment in FIG. 1.

Figure 14:
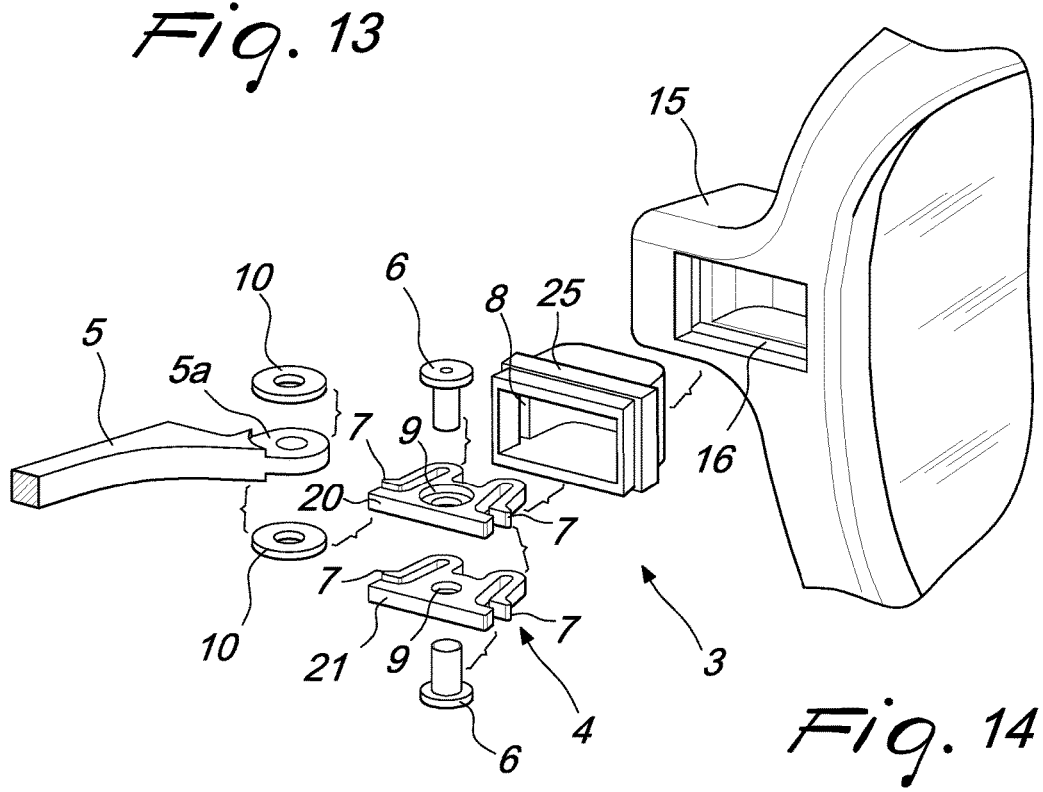
FIG. 14 is an exploded perspective view of a further variation of the first embodiment of the device according to the present disclosure.

FIG. 14 shows a variation of embodiment, showing the boxlike body 25 and in which the central body 4 can be provided, not only as a first C-shaped hollow body, but also as a body in two separate elements, which are adapted to be arranged parallel to each other and engaged with each other by way of the pivot 6. The two separate elements are designated by the reference numerals 20 and 21.

The central body 4 made of two separate elements, 20 and 21, can also be used in the first embodiment of the disclosure, when the second hollow body 2 is made C-shaped, as illustrated in FIG. 1.

Figure 15:
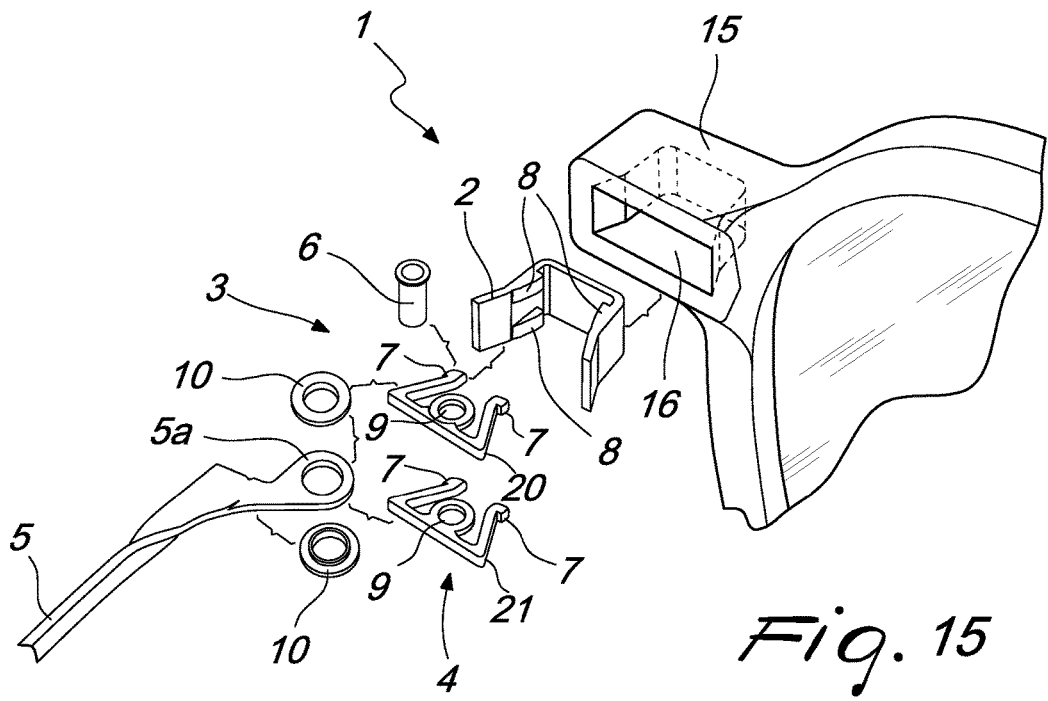
FIG. 15 is an exploded perspective view of a further variation of the first embodiment of the device according to the present disclosure.

This variation of the first embodiment is shown in FIG. 15.

Figure 16:
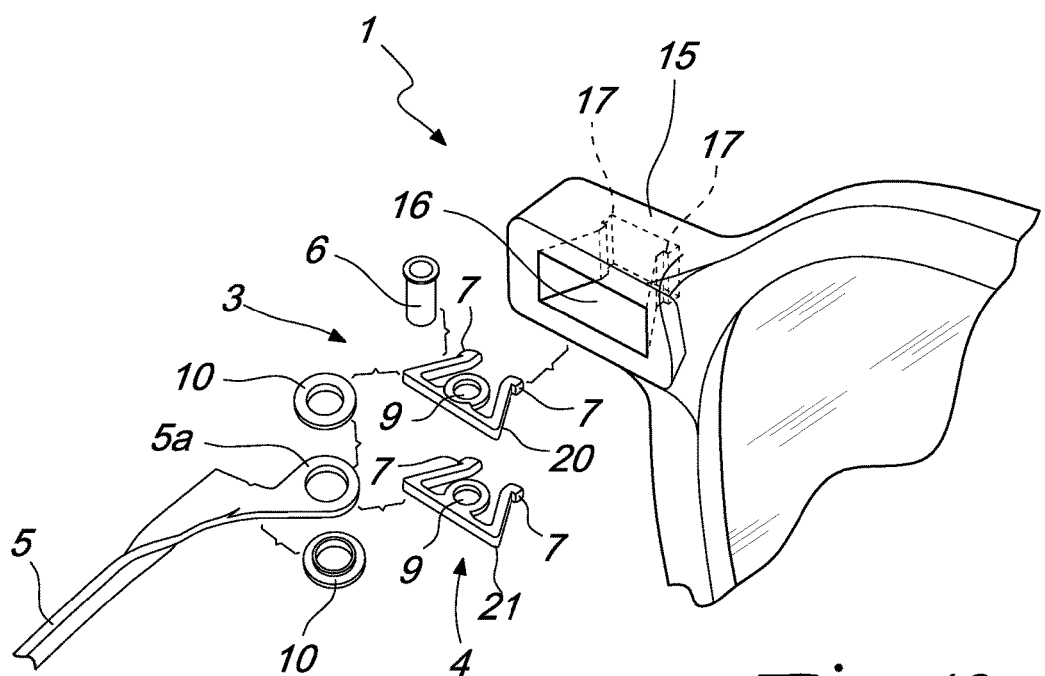
FIG. 16 is an exploded perspective view of a variation of the second embodiment of the device according to the disclosure.

The central body 4 made of two separate parts 20 and 21 can also be used in a variation of the second embodiment, as illustrated in FIG. 16, in which the central body 4 (in two parts) is accommodated in the portion 16 defined in the end piece 15.

Moreover, all the details may be substituted by other, technically equivalent elements.

In practice the materials employed, and the contingent shapes and dimensions, may be any according to requirements and to the state of the art.

The invention claimed is:

1. A hinge device for eyeglasses comprising an accommodation body provided with engagement seats for gripping and locking a hinge body to an end piece of an eyeglass frame, said hinge body comprising a central body that is adapted to engage within said accommodation body, said central body being adapted to engage in turn a temple of said eyeglass frame, wherein said central body is provided as a first C-shaped hollow body, provided with teeth that are adapted to engage engagement seats that are defined in said accommodation body, and wherein said central body provided as a first C-shaped hollow body is provided with a pair of coaxial eyelets that are adapted to allow the interposition of an eyelet of the temple and the locking by way of a pivot that passes through said coaxial eyelets and said eyelet of the temple.

2. The hinge device according to claim 1, wherein said accommodation body is defined by a second C-shaped hollow body provided with engagement seats.

3. The hinge device according to claim 1, wherein said central body is defined by a single element that is folded onto itself so as to define said first C-shaped hollow body.

4. The hinge device according to claim 1, wherein said central body is defined by two separate elements, which are adapted to engage separately in said accommodation body.

5. The hinge device according to claim 1, wherein said accommodation body is defined by a box-like body that is provided with engagement seats.

6. The hinge device according to claim 5, wherein said accommodation body is provided inside said end piece, said engagement seats being in turn provided within said end piece, so as to define a second C-shaped hollow body.

7. The hinge device according to claim 1, further comprising washers that are adapted to be arranged symmetrically so as to interpose themselves between the coaxial eyelets and the eyelet and be passed through by said pivot.

8. The hinge device according to claim 1, wherein said accommodation body defines a portion that is adapted to accommodate said hinge body.

9. An eyeglass frame comprising a hinge device according to claim 1.

* * * * *